United States Patent [19]  [11]  4,351,885
Depoisier et al.  [45]  Sep. 28, 1982

[54] METHOD OF IMPROVING FRICTION CONTACT BETWEEN FRICTION ELEMENTS OF A STATIC BRAKE AND IMPROVED FRICTION ELEMENT

[75] Inventors: Jean-Claude Depoisier, Paris; Léonce E. R. Rogier, Saint-Denis, both of France

[73] Assignee: Societe Anonyme Francaise du Ferodo, Paris, France

[21] Appl. No.: 81,360

[22] Filed: Oct. 3, 1979

[30] Foreign Application Priority Data

Oct. 3, 1978 [FR] France .................................. 78 28234

[51] Int. Cl.³ .......................... B22F 5/00; F16D 69/00
[52] U.S. Cl. ................................. 428/544; 188/251 M
[58] Field of Search ................... 188/251 M; 427/191, 427/192, 427, 422, 423; 428/544

[56] References Cited
U.S. PATENT DOCUMENTS

| 2,588,421 | 3/1952 | Shepard | 188/251 M |
|---|---|---|---|
| 2,775,323 | 12/1956 | English | 188/251 M |
| 2,899,740 | 8/1959 | Cox | 188/251 M X |
| 3,191,734 | 6/1965 | Batchelor et al. | 188/251 M X |
| 3,376,960 | 4/1968 | Bender | 188/251 M |
| 3,606,665 | 9/1971 | Glucopt | 188/251 M X |
| 3,791,493 | 2/1974 | Yamaguchi et al. | 188/251 M |

FOREIGN PATENT DOCUMENTS

| 2742798 | 4/1979 | Fed. Rep. of Germany | 188/251 M |
|---|---|---|---|
| 1010748 | 6/1952 | France . | |
| 1424201 | 2/1976 | United Kingdom | 188/251 M |

Primary Examiner—Brooks H. Hunt
Attorney, Agent, or Firm—Charles E. Brown

[57] ABSTRACT

A method of providing an improved friction surface and a friction element having such an improved friction surface are disclosed. A surface of a metallic friction element, e.g. a brake pad or a brake disc or drum, is metal-sprayed with a metallic substance which defines asperities the average roughness Ra of which ranges between 3 and 60 microns. Preferably, at least some of the asperities have heights ranging between 20 and 40 microns for a base width between 0.5 and 1 mm.

7 Claims, 5 Drawing Figures

METHOD OF IMPROVING FRICTION CONTACT BETWEEN FRICTION ELEMENTS OF A STATIC BRAKE AND IMPROVED FRICTION ELEMENT

The present invention relates generally to brakes, and more particularly to a method of improving friction contact between the opposed friction elements of the brake.

As is known a brake comprises at least two opposed friction elements adapted to be brought into contact with each other. One of the friction elements is provided with a friction facing made of, for example, a rubber based material, a composite material or a metallic material and the other friction element is made of a complementary material referred to herein as a "counter" material, which is generally a metallic material, in particular steel or cast iron. The first friction element most often comprises a shoe or pad adapted to cooperate with a friction path defined on the other friction element, regardless of whether the other friction element comprises, for example, a disc, a drum or a band.

The present invention relates more particularly to so-called static brakes, which normally operate under static conditions, i.e., brakes which are adapted to maintain a braked member in its arrested position; the opposed friction elements of such brakes are therefore not subjected to continual relative displacement when they are brought into braking contact with each other, but simply to arrest a load and maintain it in its arrested position. Such is the case with industrial safety brakes and may also apply to emergency or parking brakes for motor vehicles.

Industrial safety brakes are subjected to various desiderata which are specific to them: the tangential load that they must withstand is usually high; the surfaces of their facings for reasons of compactness are usually rather small; the available space for mounting and housing the safety brake is often restricted; and also by reason of their normal operating mode which as mentioned above is static, the friction facings are not usually run in with the counter material against which they are applied, yet they are intended to arrest a load in movement and maintain it in its arrested position.

Though the static coefficient of friction on which the tangential load to be absorbed depends, relies essentially on the nature of the material constituting the friction facings and the state of the surface of the corresponding counter material, in practice it also depends on conditions in which the friction facings are applied against the counter material.

In the absence of any running-in of the brake as is usually the case for essentially static braking, without a preliminary dynamic braking, the conditions of application are unsure, the friction facings do not bear over their entire surfaces against the counter material, inevitably resulting in a noticeable reduction of the corresponding coefficient of friction.

Accordingly the coefficient of friction designed to enable the effective braking of a given tangential load may in practice fall below the level sufficient to brake the load.

In this event the number of safety brakes would have to be increased which is generally difficult for reasons of space alluded to above, and which would moreover make the brake expensive; or new friction elements would have to have sufficient of static friction to enable, even at an reduced initial value, the braking of the tangential load to be achieved.

As the counter material is usually machined more or less smooth for reasons of dimensional tolerances, the improved coefficient of static friction has, up to the present, been attained by an appropriate choice of the materials of which the friction facings are made.

With composite materials an upper limit of the order of 0.2–0.4 is quickly reached. With rubber this limit may be stretched to about 0.6 but not beyond that by reason of the elasticity inherent in such a material. With certain metallic substances, namely aluminum, it is possible to attain 0.9 but with the risk of the facing material adhering to the counter material which may lead to the friction elements becoming welded together.

Contrary to current practices with regard to metallic friction elements wherein their surfaces are smoothed when they are machined to the desired dimensions in order to prevent rapid wear of the friction material by a "grating action", an object of the present invention consists in providing roughness asperities so as to obtain an elevated static coefficient of friction of the order of about 0.7–0.8 without the drawback of possible causing, the welding of the friction elements as mentioned above.

According to a more specific object of the present invention there is provided a method for improving frictional conditions between two opposed friction elements, one of the friction elements being metallic, characterized by metal spraying a metallic substance on the surface of the metallic friction element thereby forming asperities having an average roughness Ra ranging between 3 and 60 microns.

According to the invention, there is also provided a metallic friction element with asperities having an average roughness Ra ranging between 3 and 60 microns.

The term average roughness Ra, as regards the asperities, is defined as the arithmetical average of the departures of the profile above and below a reference line or surface through a sample as provided in, inter alia, French Standard NF E 05 105.

In actual practice, the asperities, or at least some of them, are measured with a TALYSURF 10 surface roughness measuring instrument have heights ranging between 20 and 40 microns for a base width ranging between 0.5 and 1 mm.

The spraying step according to the invention for the formation of the sought after asperities is known per se, namely for metal-spraying to protect against corrosion.

Yet it has been established that not only does the present method not have a negative effect, on the mechanical strength of the underlying metal, but on the contrary it enhances the mechanical properties so that they are considerably superior to those which would have been obtained if the metal were simply rolled or cast. In particular the hardness and the shear strength for forces perpendicular to the lamina of the metal, which is the case here, are improved.

Thus, independently of the dimensional characteristics referred to above, which the spraying step presents, the present method produces asperities having excellent mechanical properties. It is therefore particularly well suited for producing the asperities according to the invention.

The present method has the further advantage or producing homogeneous asperities which are uniform in size and shape and durable.

Yet another advantage of the present method is that it may be applied to the counter material, thereby permitting treatment of a pre-existing disc or drum, or to the friction facings themselves when they are metallic friction facings.

The objects, features and advantages of the invention will be better understood from the description which follows, given by way of example, with reference to the accompanying schematic drawings, in which.

The drawings illustrate, by way of example, the use of the invention as applied to a so-called static disc brake used to arrest a load and maintain it in its arrested position but whose friction elements are not intended to be subjected to continual relative displacements as in dynamic braking.

Figure 1:
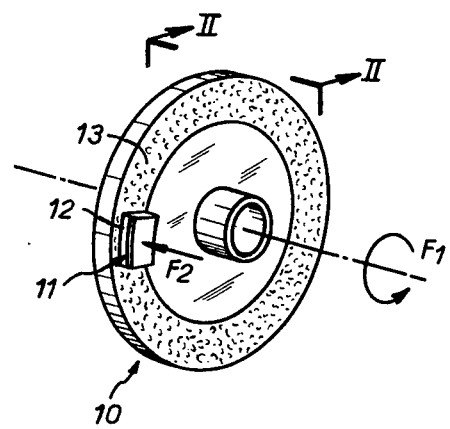
FIG. 1 is a diagrammatic perspective view of a brake embodying the invention.

The brake comprises a disc 10 mounted for rotation about its axis in the direction of arrow F1 in FIG. 1, and at least one friction pad or shoe of which only friction pad or shoe 11 is shown, adapted to be applied against disc 10 parallel to the axis thereof in the direction F2 in FIG. 1, while being maintained circumferentially relative to the disc 10 is metallic, e.g., steel.

According to the invention the metallic friction element, which is the disc 10 in the illustrated embodiment, has on its surface along the friction path 13 with which the friction pad or shoe 11 must cooperate, asperities 14 the average roughness Ra ranging between 3 and 60 microns.

Figure 3:
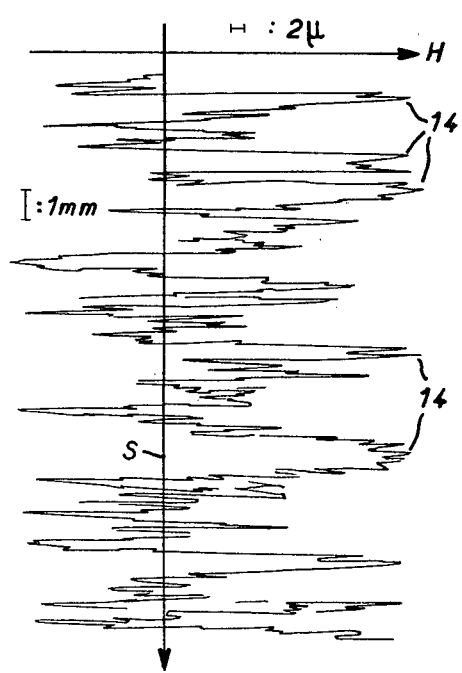
FIG. 3 shows a diagram, on an enlarged scale, of the part of FIG. 2 in inset III.

Illustrated in the diagram of FIG. 3 is the configuration of asperities 14 as detected by a TALYSURF 10 surface roughness measuring instrument sold by Taylor-Hobson. Along the abscissa is marked the height H of the asperities relative to the reference surface S the disc 10. At least some of the asperities have heights ranging between 20 and 40 microns for a base width at the reference surface S ranging between 0.5 to 1 mm. These heights and/or widths may be greater.

Figure 4:
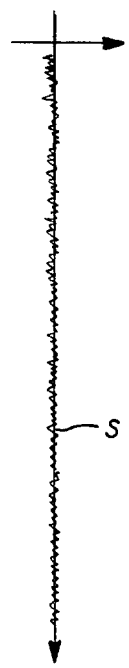
FIGS. 4 and 5 are similar diagrams illustrating the profile obtained on such friction elements according to the prior art.

The characteristics proper to the asperities according to the invention will be better understood by comparing the diagram of FIG. 3 to the diagram of FIG. 4 which relates to a conventional disc surface once it has been machined to its ultimate dimensions, i.e., in practice, its surface asperities constitute a reference for those according to the invention.

Figure 5:
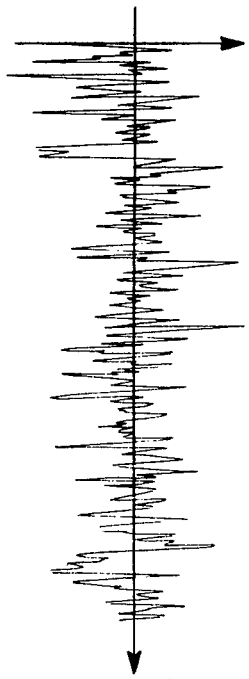

The same applies by way of comparison, to the diagram of FIG. 5 which refers to a disc surface the friction path of which has been sandblasted.

The diagrams of FIGS. 4 and 5 are on the same scale as that of FIG. 3 which scale is marked in the diagram of FIG. 3.

Figure 2:
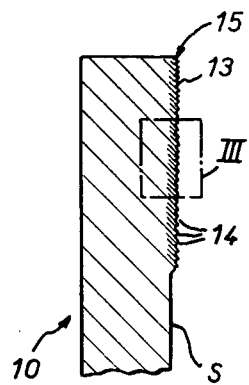
FIG. 2 is an enlarged fragmentary view, in longitudinal section, of a friction element of the brake of FIG. 1.

Preferably, as mentioned above, the asperities 14 according to the invention are advantageously formed by adding a metallic substance and more particularly by metal-spraying the metallic substance. In other words the asperities together form a rough layer 15 on the surface of the firction path 13 as schematically represented in FIG. 2.

The method of metal-spraying the metallic substance is well known in itself and as its features are not part of the present invention it will not be described in detail herein. It will be sufficient to recall that it is carried out with the aid of a spray gun which is supplied with the metallic substance in wire form. The spray gun then melts the metallic substance and projects the molten metallic substance on an article spaced therefrom. Accordingly any metallic substance, be it a metal or an alloy, is suitable for producing the asperities according to the invention provided that it may be drawn into a wire. It is also possible to use a metallic powder which is melted in the spray gun and then projected.

Certain metals such as lead and tin which lack sufficient hardness are to be excluded however.

On the other hand cooper, molybdenum, nickel, aluminium, silver, and/or their alloys, in particular, bronze, brass and steel are suitable.

Preferably before spraying the metallic substance the friction element being treated, here the disc 10, is sandblasted.

In addition in order to provide a good adhesion of the asperities layer to be formed, it may be necessary to apply beforehand, after sand-blasting, an appropriate metallic undercoat. For example, before metal-spraying an asperities layer of steel an undercoat of molybdenum is sprayed on the sandblasted friction path.

In any event tests have proven that the coefficient of static friction obtained with the asperities according to the invention is very high. For example with a rubber/steel friction contact the coefficient of static friction may attain 0.75.

With a simple sandblasting of the friction path according to the diagram of FIG. 5 the results are markedly inferior and inadequate in practice.

It goes without say that the friction facing used is not necessarily made of rubber. On the contrary it may be made of a metallic substance. In the latter case, if desired, the metallic friction facing may be provided with the surface asperities according to the invention for contact with the counter surface.

The present invention is moreover not limited to the described and illustrated embodiment but encompasses all modifications, alternatives and equivalents without departing from the spirit and scope of the invention.

In all cases the thickness of the asperities layer will obviously have to be taken into account. The thickness is determined by means known in the art.

What is claimed is:

1. A method of providing an improved friction surface on a metallic friction element for use in so-called static braking with an opposed friction element, comprising metal-spraying a metallic substance on a surface of said metallic friction element thereby forming asperities the average roughness Ra of which ranges between 3 and 60 microns, and utilizing said as sprayed metallic substance as a braking surface.

2. A friction element adapted to be brought into so-called static braking relation with an opposed friction element, said friction element being metallic, and having a sprayed metallic layer on a surface of said friction element, said sprayed metallic layer having a surface defining a braking surface including asperities having an average roughness Ra ranging between 3 and 60 microns.

3. A friction element according to claim 2 wherein at least some of the asperities of said braking surface have heights ranging between 20 and 40 microns for a base width ranging between 0.5 and 1 mm.

4. A method according to claim 1 wherein said surface of said metallic friction element is abraded prior to said metal spraying.

5. A method according to claim 1 wherein said surface of said metallic friction element is abraded and then provided with a metal undercoat prior to said metal spraying.

6. A friction element according to claim 2 wherein said friction element surface is an abraded surface.

7. A friction element according to claim 2 wherein said friction element surface is an abraded surface having a metal coating thereon.

* * * * *